3,453,177
MEANS FOR CONTROLLING THE FLOW OF HEAT THROUGH WALLS OF A CONCRETE PRESSURE VESSEL
Roy Bilsborough and Colm O'Tallamhain, Knutsford, England, assignors to The Nuclear Power Plant Company Limited and A.E.I.-John Thompson Nuclear Energy Company Limited, trading in partnership together under the name of The Nuclear Power Group, Radbroke Hall, Knutsford, Cheshire, England, both British companies
Filed Sept. 30, 1966, Ser. No. 583,381
Claims priority, application Great Britain, Oct. 8, 1965, 42,872/65
Int. Cl. G21c *11/00, 15/02;* F28f *13/00*
U.S. Cl. 176—50                                  5 Claims

ABSTRACT OF THE DISCLOSURE

A system for controlling the temperature of the outer concrete shell of a nuclear reactor with coolant which is caused to flow inwardly from the inner wall of the shell through an insulating layer towards the reactor core.

---

This invention relates to means for controlling the flow of heat through walls. It is particularly, though not exclusively, applicable to the walls of concrete pressure vessels for nuclear reactors.

In order to retain the strength properties of concrete in a concrete pressue vessel for a nuclear reactor, it is necessary to insulate thermally the concrete from heat generated by the reactor core and heat carried by the reactor coolant after passing through the core. In addition to the use of thermal insulation materials, it is, in most instances, necessary to cool the concrete by circulating a coolant through or over the inner surfaces thereof. The coolant for the concrete usually flows in a circuit separate from the main reactor coolant circuit and the heat rejected to the coolant circuit for the concrete is ultimately removed in a heat sink and represents a loss of reactor heat output.

According to the present invention means for controlling the flow of heat through a wall comprise a layer of thermal insulation adjacent the wall, but spaced therefrom so as to provide a space for the flow of fluid between the wall and the layer, the layer having passages therein to permit the flow of fluid across the layer from one surface thereof to the other.

The invention also consists in apparatus in accordance with the preceding paragraph in which the layer is placed adjacent the hotter surface of the wall and the fluid is used to cool the wall.

The invention also consists in apparatus in accordance with either of the preceding two paragraphs in which the thermal insulation is of permeable material.

The invention also consists in apparatus in accordance with either of the first two of the preceding three paragraphs in which the thermal insulation is of solid material with passages formed therein.

The invention also consists in apparatus in accordance with any of the preceding four paragraphs in which the layer of thermal insulation is made up of a number of sublayers.

The invention also consists in apparatus in accordance with any of the preceding five paragraphs in which the layer of thermal insulation is supported between perforated walls.

The invention also consists in means for controlling the flow of heat into the wall of a concrete pressure vessel containing a nuclear reactor core, which means comprise a layer of thermal insulation adjacent the inner surface of the vessel wall but spaced therefrom to provide a passage for coolant flow between the layer of insulation and the inner surface of the wall of the vessel, said insulation having passages therein to permit the flow of coolant through the layer of insulation from an outer surface to an inner surface thereof.

The invention also consists in apparatus in accordance with the preceding paragraph in which coolant after passing through the layer of thermal insulation is mixed with coolant used for cooling the reactor core.

The invention also consists in apparatus in accordance with either of the preceding two paragraphs applied in a water moderated nuclear reactor, the insulation coolant being water.

The invention also consists in means for controlling the flow of heat through a wall substantially as described herein with reference to the accompanying diagrammatic drawings in which.

Figure 1:
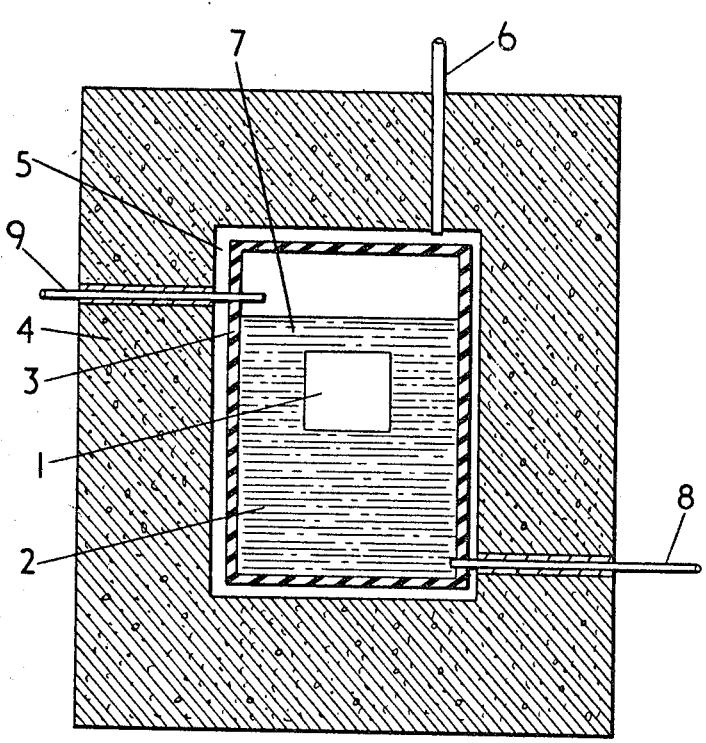
FIGURE 1 is a section through a boiling water reactor enclosed in a concrete pressure vessel showing in outline the main features of the reactor.

In carrying the invention into effect in the forms illustrated by way of example and referring first to FIGURE 1, a boiling water reactor comprises a reactor core 1 housing nuclear fuel, the core being immersed in water 2, which acts as a neutron moderator and reactor coolant.

The water 2 is contained within a layer 3 of thermal insulation which is adjacent to, but spaced from the walls of concrete pressure vessel 4. The inner surface of the concrete vessel has a steel liner in accordance with known practice. Into the space 5 formed between the layer 3 and the walls of vessel 4 is introduced coolant in the form of water. The coolant is introduced through inlet duct 6.

The water 2 is fed into the space 7 surrounding the reactor core through inlet pipe 8. Steam produced by heat generated in the reactor core gathers in a space above the surface of water 2 and leaves the vessel through outlet 9. The steam leaving outlet 9 is conveyed to a source of steam consumption (not shown) such as a steam turbine, condensed and then returned to the reactor, through inlet 8 and inlet 6. That returned through inlet 8 can be pre-heated in accordance with known practice. If desired the steam leaving outlet 9 can be further heated in accordance with known practice before being used.

The layer 3 of thermal insulation has passages therein to permit the flow of water in space 5 to pass through the insulation and mix with the water 2 in space 7.

With such an arrangement the water in space 5, which is the cooling water for the walls of the vessel 4, has its temperature increased as it passes through layer 3 until, on leaving the layer, it is at the temperature of the water 2. Thus, in a typical case, the temperature rise in the water in passing through the insulation may be 300° C. as opposed to a rise of the order of 25° C. in a conventional arrangement in which coolant flowing in a space between the thermal insulation and the wall of the vessel 4 is not allowed to pass through the insulation but flows in a circuit separate from that of the reactor coolant. As, for a given insulation conductance, the flow of coolant in space 5 is inversely proportional to the temperature rise in the coolant, a much reduced coolant flow is achieved with the arrangement of the invention. Alternatively for a given coolant flow in space 5, a reduced insulation conductance is required permitting the use of a thinner layer or the use of cheaper insulation materials or both.

The water passing through the insulating layer 3 is converted to steam and subsequently passes to the source of heat consumption through outlet 9. This results in increased overall efficiency compared with a conventional arrangement in which a coolant used to cool the wall of the vessel is kept separate from the primary coolant and does not have its temperature varied to any appreciable extent. The heat content of such coolants is rejected at low temperature and represents a heat loss.

A further feature of the arrangement is that the inside surface of the concrete vessel 4 is kept at a temperature substantially equal to that of the incoming cooling water through inlet 6, for example 20° C. In the aforesaid known arrangement there can be a temperature rise in the cooling water of the order of 5–10° C. to say 30° C. but the concrete temperature may be as much as 30° C. higher than the coolant as a result of heat conductance through the concrete and liner.

The pressure of the water in the space 7 will vary at different levels depending on such factors as pressure drop through the core and other components. In a boiling water reactor with forced circulation of the water cooling the core, this pressure variation may be of the order of 30 pounds per square inch, whilst in a reactor with natural circulation of the water cooling the core, the pressure variation may be of the order of 5 pounds per square inch. It is essential that the pressure of the coolant in space 5 be higher at all points than the pressure of the reactor coolant in space 7 so as to ensure that the coolant in space 5 flows inwards through the insulation. As a consequence of the varying pressure of the reactor coolant the pressure of the coolant in space 5 must be sufficiently high to ensure that the pressure difference is always such that the minimum flow rate through the insulation is sufficient to remove the heat conducted through the insulation at the point of minimum flow. In some instances it may be desirable to divide the space 5 into separate pressurized compartments each supplied separately with coolant.

The basic requirements for the thermal insulation material are:

(a) It should have a coolant flow-pressure drop characteristic so that the coolant flow is sufficient to remove the heat conducted through the insulation at any point and such that the resistance to flow is sufficient to suppress natural convection currents in the insulation.

(b) It should have a reasonably low thermal conductance. This will vary with circumstances but a typical value for a boiling water reactor of the kind described above could be in the range 1 to 20 B.t.u./° F./sq. ft./hr.

(c) It should be compatible with the coolant which must pass through it, for example, it should be insoluble and not be corroded by the coolant. In the reactor application, in particular, it should also be free from fragments or powder which can be carried by the coolant into the reactor.

(d) It should be capable of withstanding large temperature gradients for example 500° F. per inch. If a given material cannot meet the requirements of withstanding a high temperature gradient and high resistance to coolant flow, the insulation can be formed of two or more layers, one layer capable of withstanding the temperature gradient and the other layer or layers providing the necessary flow resistance.

A suitable material for the reactor application is permeable sintered alumina. Perforated sheets of thermal insulating material may also be used.

Figure 2:
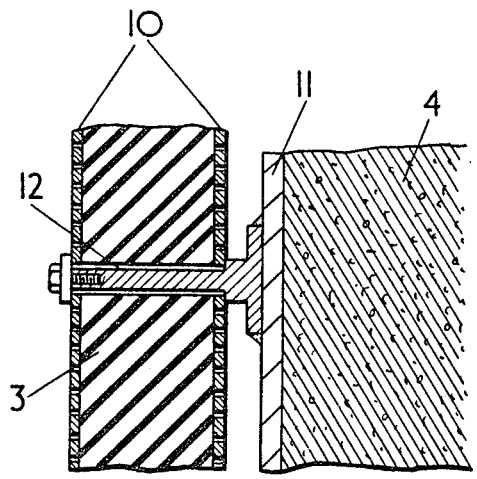
FIGURE 2 is a section through part of a layer of thermal insulation in accordance with one embodiment of the invention.

FIGURE 2 shows a typical support arrangement for the thermal insulation when used in conjunction with a concrete pressure vessel for a nuclear reactor. The insulation 3 is supported between perforated plates 10 which are connected to steel liner 11 of the concrete vessel 4 by means of brackets 12 as shown.

Whilst the invention has been described with particular reference to a boiling water reactor, its use is not limited thereto. It could, for example, be used in pressurised water reactors, in pressure tube reactors to control the heat flow into the pressure tube, or in gas cooled reactors. Generally speaking the coolant in space 5 should be the same as the reactor coolant or at least be miscible therewith. In some circumstances, however, it may be possible to use coolants which are not miscible. In such a case, to avoid heat loss, the coolant flowing through the insulation could flow in a separate circuit and could give up its heat to some form of thermal cycle outside the reactor, for example, a thermal cycle using auxiliary turbines. In the case of a pressurised water reactor where the water flowing through the insulation enters the pressurised water system, it will be necessary to remove that proportion of the water entering the pressurised water system which exceeds the amount normally lost due to leakage otherwise the amount of water circulating in the pressurised system would increase. The coolant removed is, however, at a temperature where it can usefully be employed in a subsidiary thermal cycle.

The arrangement described is also applicable outside the reactor field. It could, for example, be applied to the control of the flow of heat to the walls of any vessel containing a source of heat. Equally it could be applied to control the heat flow through any wall across which there is a temperature gradient. If, for example, it is used to insulate thermally the wall of a vessel containing a substance at very low temperature, the cold substance or a fluid cooling the cold substance could be allowed to percolate through the insulating layer to a space between the insulation and the wall of the vessel.

We claim:

1. Means for controlling the flow of heat into the wall of a concrete pressure vessel containing a nuclear reactor core, which means comprises in combination a layer of thermal insulation adjacent to the inner surface of the vessel wall, spaced therefrom to provide a passage for coolant flow between the layer of the insulation and the inner surface of the wall of the vessel, said insulation having passage means therethrough, and means to promote a flow of coolant across said layer through said passage means from an outer surface of said layer to an inner surface thereof.

2. The combination of claim 1, wherein said last-indicated means includes means for introducing said coolant to said passage from a source external to said core.

3. The combination of claim 1, in which the coolant after passing through the layer of thermal insulation is mixed into coolant used for cooling the reactor core.

4. The combination of claim 1, applied in a water moderated nuclear reactor, the insulation coolant being water.

5. Means for controlling the flow of heat into the wall of a concrete pressure vessel containing a liquid moderated reactor core, which means comprises in combination a layer of thermal insulation forming a containment vessel for said liquid moderator, said layer being adjacent the inner surface of the vessel wall but spaced therefrom to provide a passage for liquid coolant between the layer of insulation and the inner surface of the wall of the vessel, said insulation having passage means therethrough and means promoting the flow of liquid coolant from said passage, through said passage means into the liquid moderator.

References Cited

UNITED STATES PATENTS

| 3,275,523 | 9/1966 | Campbell et al. | 176—87 |
| 3,320,969 | 5/1967 | Gordon | 176—87 |
| 3,322,639 | 5/1967 | Davidson | 176—87 |

FOREIGN PATENTS

| 875,868 | 8/1961 | Great Britain. |

REUBEN EPSTEIN, *Primary Examiner.*

U.S. Cl. X.R.

165—136; 176—53, 87